UNITED STATES PATENT OFFICE.

THOMAS ENDE, OF NEW YORK, N. Y.

IMPROVEMENT IN SIZE COMPOUNDS.

Specification forming part of Letters Patent No. 159,504, dated February 9, 1875; application filed December 15, 1874.

*To all whom it may concern:*

Be it known that I, THOMAS ENDE, of the city of New York, county and State of New York, have invented a new Composition of Matter designed as a substitute for glue-size, of which the following is a specification:

My new size is composed of the following-named ingredients, namely: Irish moss, gum-arabic, chloride of potash, and carbolic acid, which I compound in the following manner and proportions: I put a pound of Irish moss into five gallons of water, and boil slowly for about four hours. To this I add a pound of gum-arabic dissolved in one gallon of water, an ounce of the chloride of potash dissolved in, say, a gill of water, and one-half an ounce of carbolic acid. After these ingredients are thoroughly mixed, while warm, I strain the mass through a cloth several times, to remove all impurities or solid matter, when the size is ready for use.

The proportions named, and the particular method described of compounding the ingredients named, I would recommend as the best. They may, however, be varied within reasonable limits without materially affecting the compound.

As a size for walls or other surfaces, preparatory to painting, calcimining, &c., the compound described will be found cheap, efficient, and indestructible.

What I claim is—

A size compound of Irish moss, gum-arabic, chlorate of potash, and carbolic acid, substantially as described.

Witness my hand this 10th day of December, 1874.

THOS. ENDE.

Witnesses:
  WM. W. RUSSELL,
  B. S. CLARK.